US010049572B2

(12) United States Patent
Maertens

(10) Patent No.: US 10,049,572 B2
(45) Date of Patent: Aug. 14, 2018

(54) MASS TRANSIT-BASED PEOPLE TRAFFIC SENSING AND CONTROL

(71) Applicant: Microsoft Technology Licensing, LLC, Redmond, WA (US)

(72) Inventor: Katherine A. Maertens, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 7 days.

(21) Appl. No.: 15/349,249

(22) Filed: Nov. 11, 2016

(65) Prior Publication Data
US 2018/0137757 A1    May 17, 2018

(51) Int. Cl.
*G08G 1/01* (2006.01)
*G08G 1/123* (2006.01)
*G08G 1/005* (2006.01)
*G06K 9/00* (2006.01)

(52) U.S. Cl.
CPC .......... *G08G 1/123* (2013.01); *G08G 1/0133* (2013.01); *G06K 9/00771* (2013.01); *G06K 9/00778* (2013.01); *G06K 9/00838* (2013.01); *G08G 1/005* (2013.01); *G08G 1/0141* (2013.01)

(58) Field of Classification Search
CPC .......... G06K 9/00771; G06K 9/00778; G06K 9/00838; G08G 1/0141; G08G 1/0133; G08G 1/005; G08G 1/123; G08G 1/13; G08G 1/20; G06Q 10/04; G06Q 10/047; G01C 21/3492
See application file for complete search history.

(56) References Cited

U.S. PATENT DOCUMENTS

| 5,739,774 | A | 4/1998 | Olandesi |
| 6,006,159 | A | 12/1999 | Schmier et al. |
| 6,253,148 | B1 | 6/2001 | Decaux et al. |
| 6,374,176 | B1 | 4/2002 | Schmier et al. |
| 6,584,401 | B2 | 6/2003 | Kirshenbaum et al. |
| 8,868,340 | B1 | 10/2014 | Rinckes et al. |
| 9,103,689 | B1 * | 8/2015 | Rinckes ............ G01C 21/3492 |
| 9,286,801 | B2 | 3/2016 | Kummamuru et al. |
| 2006/0164259 | A1 | 7/2006 | Winkler et al. |
| 2013/0124279 | A1 | 5/2013 | Bodin et al. |

(Continued)

FOREIGN PATENT DOCUMENTS

DE    102011050954 A1    12/2012

OTHER PUBLICATIONS

"Highlighting transit items on the map and list", Retrieved on: Aug. 10, 2016 Available at: https://www.ibm.com/support/knowledgecenter/SS9HHZ/transport/use_highlightvapmap.html.

(Continued)

*Primary Examiner* — Benyam Haile
(74) *Attorney, Agent, or Firm* — Christopher J. Volkmann; Kelly, Holt & Christenson, PLLC

(57) ABSTRACT

User location is detected. User traffic at a mass transit stop near the user location is detected and compared to user traffic at other mass transit stops in close proximity to the first mass transit stop. An alternate stop identifier system is controlled to surface information indicative of a location of an alternate mass transit stop for a user along with a commute time impact metric indicative of how the user's commute time will be affected by using the alternate stop.

18 Claims, 10 Drawing Sheets

(56) References Cited

U.S. PATENT DOCUMENTS

| | | | | |
|---|---|---|---|---|
| 2014/0142834 A1* | 5/2014 | Maitra | ............... | G01C 21/3423 |
| | | | | 701/117 |
| 2016/0125248 A1* | 5/2016 | Lee | ........................... | G06T 7/20 |
| | | | | 382/103 |
| 2017/0017776 A1* | 1/2017 | Soulos | ................ | G06F 19/3475 |

OTHER PUBLICATIONS

"Calculate a Route", Published on: Jul. 5, 2012 Available at: https://msdn.microsoft.com/en-us/library/ff701717.aspx.
Balagapo, et al., "Data Crowdsourcing and Traffic Sensitive Routing for a Mixed Mode Public Transit System", In Proceedings of 5th International Conference on Information, Intelligence, Systems and Applications, Jul. 7, 2014, 6 pages.
"iTrans NJT", Published on: Jan. 27, 2013 Available at: http://www.itrans.info/landing/NJT/.
"Transit app: Frequently Asked Questions", Retrieved on: Aug. 10, 2016 Available at: http://transitapp.com/faqs#service-alerts.
"Transit App • Real-Time Tracker & Directions for Bus, Subway and Metro including Offline Schedules", Published on: Nov. 19, 2015 Available at: https://itunes.apple.com/us/app/transit-app-real-time-tracker/id498151501?mt=8.
Goelz, Dylan, "Roadify iPhone App", Retrieved on: Aug. 10, 2016 Available at: http://devpost.com/software/roadify-iphone-app.
"Roadify Adds a Social Element to Transit and Traffic Reports to Create NYC's First Dynamic Commuting Platform", Published on: Mar. 29, 2011 Available at: http://www.marketwired.com/press-release/roadify-adds-social-element-transit-traffic-reports-create-nycs-first-dynamic-commuting-1419080.htm.
"InTime NYC—Never miss your transport", Retrieved on: Aug. 10, 2016 Available at: https://itunes.apple.com/lk/app/intime-nyc/id402476594?mt=8.

* cited by examiner

MASS TRANSIT-BASED PEOPLE TRAFFIC SENSING AND CONTROL

BACKGROUND

There are many different types of mass transit systems that are used to provide public transportation in urban areas. Such systems often include bus systems, subway systems, elevated train systems, different kinds of light rail systems, among a variety of others.

Urban areas also have many sources of people traffic. For instance, many urban areas have large business buildings and organization worksites or offices where a large number of people work. Similarly, many urban areas have stadiums, ballparks, museums, arenas, convention centers and other venues that host events. All of these places can be significant sources of people traffic in that they can each hold large numbers of people that may use mass transit systems to get to and from those places.

When a person takes a mass transit system around heavy commute times or in a city when a large event occurs (such as a football game, a music concert, etc.) the vehicles in the mass transit system often fill up with people at the stops that are popular at that time. For instance, the popular stops may be those next to a sports stadium during an event at the stadium, those near a large office building when the organization housed by the office building ends its work day, etc. When a mass transit vehicle reaches its capacity, it often does not stop at any stops that it would normally stop at, unless someone wants to depart the vehicle at those stops. Thus, the vehicle passes by stops where it would normally stop, and no one at that stop can get on the vehicle.

In addition, the particular mass transit vehicle that a user may need to take may only come to that stop periodically (such as once every 10 minutes, 15 minutes, etc.). When the mass transit vehicles are passing that stop, because they have already reached their capacity, transit users can be left at the stop waiting until the traffic flow of people in the area dies down, so that there is room on the approaching vehicles.

In addition, some mass transit users prefer to sit when riding in the mass transit vehicle. Even if a mass transit vehicle has capacity, if the people traffic flow is heavy, the mass transit vehicle may not have any seating available. This can cause user discomfort on the mass transit vehicle.

The discussion above is merely provided for general background information and is not intended to be used as an aid in determining the scope of the claimed subject matter.

SUMMARY

User location is detected. User traffic at a mass transit stop rear the user location is detected and compared to user traffic at other mass transit stops in close proximity to the first mass transit stop. An alternate stop identifier system is controlled to surface information indicative of a location of an alternate mass transit stop for a user along with a commute time impact metric indicative of how the user's commute time will be affected by using the alternate stop.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
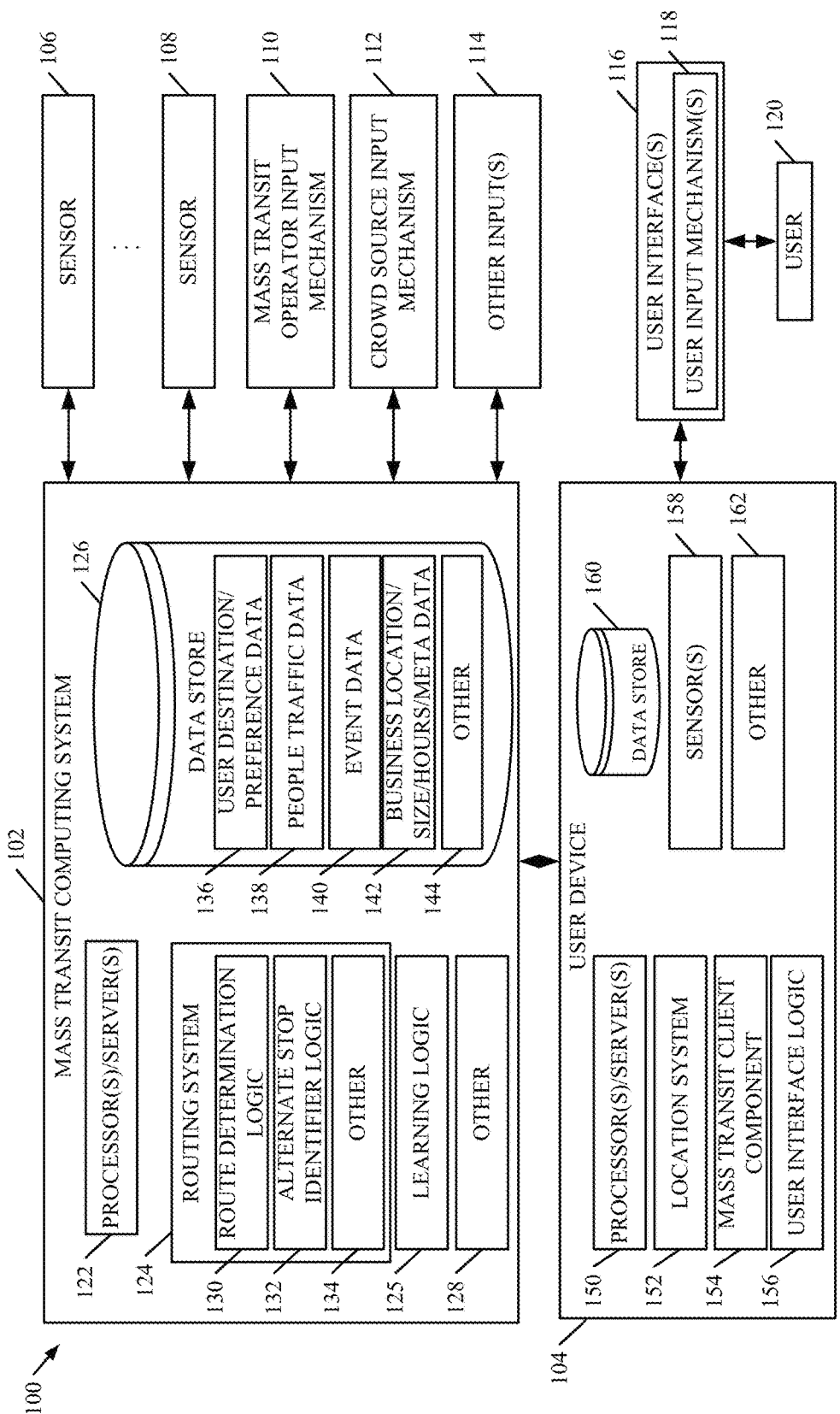
FIG. 1 is a block diagram of one example of a computing system architecture.

FIG. 1 is a block diagram of one example of a computing system architecture 100. Architecture 100 illustratively includes mass transit computing system 102 and user device 104. The example shown in FIG. 1 shows that mass transit computing system 102 can receive sensor inputs from a variety of different sensors 106-108 (some examples of which are described below), from a mass transit operator input mechanism 110 that may be deployed on a mass transit vehicle, one or more crowd source input mechanisms 112 that can be provided by applications on mobile devices or other computing devices that can be used by individuals to provide crowd sourced information to computing system 102, and it can include other inputs 114 from a variety of other sources. FIG. 1 also shows that, in one example, user device 104 generates user interfaces 116 with user input mechanisms 118 for interaction by user 120. User 120 illustratively interacts with user input mechanisms 118 to control and manipulate user device 104.

Before describing the overall operation of architecture 100 in more detail, a brief description of some of the items in architecture 100, and their operation, will first be provided. As is briefly described above, when a user is using a mass transit system, the user's normal stop may become crowded with people traffic for a variety of different reasons. For instance, it may be that the traffic is heavy because it is a conventional commute time (such as when workers are going to work or going home from work). The traffic can also be heavy around events at large event venues (such as sporting events, concerts, conventions, etc.). When this happens, the user's normal stop (where the user embarks on a mass transit vehicle) may be swamped, but another stop where the user may embark on the mass transit vehicle, and that is located only a short distance away, may have much lighter traffic. However, the user has no way of knowing this.

For instance, assume that the user's normal mass transit route has the user embarking on a mass transit vehicle at an originating stop that is one stop upstream, along a mass transit route, from a major sporting venue. Assume also that the major sporting venue is holding an event that will start within the next hour. In that case, it may be that all the mass transit vehicles passing the user's originating stop are full because they are carrying people to the major sporting venue (where they will disembark at the next stop). However, if the user were to simply walk to the stop that lets passengers off at the sporting venue (the very next stop), then the user's mass transit vehicle would have much more room on it.

It may also be, however, that the user does not know of the sporting event that is about to start. Therefore, the user may wait at his or her normal originating stop while mass transit vehicles pass that stop, because they are full. Yet, at the very next stop (which may only be a few minutes away by foot) the mass transit vehicles that the user would normally take are significantly more empty. Thus, if the user simply walked a few minutes away to the next stop, the user could easily and quickly catch a mass transit vehicle.

The present system detects people traffic at the user's normal originating stop, and at stops that are in close proximity to the user's normal originating stop. The present system can control various different types of logic to surface an alternate stop identifier for the user, and to also surface a variety of other information that may reflect the impact on the user's commute time if the user were to relocate to an alternate stop. All of these are described in greater detail below.

By way of overview, mass transit computing system 102 can include one or more processors or servers 122, routing system 124, learning logic 125, data store 126, and other items 128. Routing system 124, itself, can include route determination logic 130, alternate stop identifier logic 132, and other items 134. Data store 126 can include user destination/preference data 136, people traffic data 138, event data 140, business location/size/hours/metadata 142, and it can include other items 144. It will be noted that any or all of the data in data store 126 can be obtained from other sources or services or elsewhere.

Route determination logic 130 illustratively receives a user's originating stop input that identifies the originating stop at which user 120 will embark on a mass transit vehicle. This may be provided by the user or learned from preferred data 136 or otherwise. It can also receive destination information (which may be input by the user or learned from user destination/preference data 136 or otherwise) to calculate a mass transit route for the user. In one example, route determination logic 130 can calculate the route to identify the mass transit route with the shortest distance or commute time or the fewest stops between the originating and destination end points, or based on other criteria.

Alternate stop identifier logic 132 can illustratively access people traffic data 138, event data 140 and business location/size/hours/metadata 142 to determine whether an alternate stop should be surfaced for user 132. For instance, people traffic data 138 may be historical data indicative of the volume of people traffic at various different mass transit stops. This historical data may show trends as to when people traffic is higher and lower at the various different stops in the proximity of the user's current originating stop.

Event data 140 may be a calendar of events that are hosted by event venues in the location of the user's mass transit system. For instance, it may be a calendar of major sporting events held at the sporting venues, concerts held at concert venues, conventions held at convention centers, etc. in the user's urban area. The event data 140 may also illustratively include volume data or attendance data indicative of how heavily attended the events are. The business location/size/hours/metadata 142 illustratively describes businesses located in the urban area of the user's mass transit system. It can describe the location of each business, the approximate number of employees for each business, the working hours for each business, etc. Alternate stop identifier logic 132 can access all of this information to generate an indicator indicating how heavy the people traffic will be at the user's originating stop. If it is relatively heavy, then alternate stop identifier logic 132 can also access the information in data store 126 to determine whether an alternate stop, that is relatively close to the user's originating stop, could be used by the user to improve his or her mass transit experience.

For instance, logic 132 may identify alternate mass transit stops that the user could walk to to reduce the user's overall commute time, to increase the likelihood that a user will find a seat on a mass transit vehicle, etc. In addition, alternate stop identifier logic 132 can receive information from sensors 106-108, mass transit operator input mechanism 110, crowd source input mechanisms 112, and other inputs 114 to determine whether an alternate stop should be surfaced for the user, and to identify a particular alternate stop that should be surfaced.

Sensors 106-108 can take a wide variety of different forms. For instance, they can be seat sensors or floor sensors on mass transit vehicles that can sense when a user is seated or standing at various points on the vehicle. This can give an indication as to the remaining capacity on any given mass transit vehicle. The sensors may also indicate whether the mass transit vehicle has stopped at its last regularly scheduled stop. For instance, the sensor may be a geolocation sensor, that provides a location signal indicative of a location of the mass transit vehicle, along with a vehicle speed sensor, that provides a vehicle speed signal indicative of a speed of the vehicle. If the time corresponds to a relatively heavy people traffic time, where it would be assumed that the mass transit vehicle would stop at a particular stop, and the sensors provide sensor signals indicating that the mass transit vehicle did not stop at a particular stop, then this may indicate that the mass transit vehicle is at its capacity. Where the stop is relatively close to an intersection (where the mass transit vehicle may stop anyway), then sensors 106-108 may include a vehicle door sensor that indicates whether the mass transit vehicle door opened at the stop. This may provide additional information as to whether the mass transit vehicle is at its capacity. The sensors can include street or sidewalk sensors that sense the presence of people at stops. They can include image capture and image analysis components to determine people traffic volume, to indicate whether a mass transit vehicle is full, whether it is passing by stops, etc. These are only some examples of various sensors that can provide sensor inputs to the system.

Mass transit operator input mechanism 110 may be a mechanism that is accessible by a mass transit vehicle operator (such as a bus driver, etc.). It can be actuated by the mass transit operator in order to provide an input indicative of people traffic at various stops. For instance, each mass transit driver may have a mobile device with an application that provides a suitable user input mechanism (such as a button). When the driver actuates the button, this may cause the mobile device to communicate with computing system 102 to provide an input to alternate stop identifier logic 132 indicating that the mass transit vehicle has just skipped a particular stop, because it is already at its capacity. These are only examples of mechanism 110 and others can be used as well.

Crowd source input mechanism 112 can be any type of mechanism that can be actuated by users in order to generate crowd sourced data. As an example, where a plurality of mass transit users have mobile devices, they may also be able to obtain an application that provides a user input mechanism that can be actuated by the users in order to provide information indicative of people traffic at various transit stops. For instance, where a user sees a bus pass a bus stop, where it would normally stop, the user can actuate the user input mechanism to provide an input indicating that the bus was likely at capacity, because it skipped a normal stop where people were waiting. The input from both the mass transit operator and the crowd source input, will illustratively include a time of day that the input was provided, an identification of the particular stop where the information was generated, and it can be correlated to other information, such as weather information indicative of the weather conditions at the time, or a wide variety of other information.

Other inputs 114 can be generated in a wide variety of other ways. For instance, they can be generated by separate services which provide information that may bear on people traffic at various mass transit stops. They can be, for instance, weather services that provide weather data, event services that provide information indicative of scheduled events in the urban area (and the actual or likely attendance at a particular event), mass transit services that indicate whether there is a problem with a mass transit service (such as whether a bus has broken down, a train has encountered mechanical problems, etc.), or a wide variety of other inputs.

It will be noted that the inputs from sensors 106-108, the mass transit operator input mechanism 110, crowd source input mechanisms 112 and other inputs 114 may be used by not only routing system 124, but they may also be used by learning logic 125 to generate people traffic data 138. Thus, learning logic 125 may be a machine learning system, a dynamically modified model, or another system, that generates people traffic data 138 indicative of traffic trends on certain days, during certain times of day, during certain weather conditions, at various urban locations on the mass transit system, etc.

User device 104 is illustratively a device used by user 120 who is attempting to use a mass transit system. User device 104 illustratively includes one or more processors or servers 150, location system 152, mass transit client component 154, user interface logic 156, one or more sensors 158, data store 160, and it can include a wide variety of other functionality or items 162. Location system 152 illustratively senses a current location of device 104. It can thus be a global positioning system (GPS) receiver, a cellular triangulation system, a dead reckoning system, or a wide variety of other location systems.

Mass transit client component 154 can be a client component of mass transit computing system 102 that can be used to interact with mass transit computing system 102 or that can be used to perform any or all of the processing for user 120, on user device 104, with respect to mass transit computing system 102. Where mass transit computing system 102 is a hosted service, accessible through a web browser, then component 154 may be a browser. These are examples only.

Sensors 158 can include a wide variety of different sensors. They can be motion sensors that sense the motion of user 120, weather sensors that sense the weather conditions in the location of device 104, photo sensors (such as cameras, video recorders, etc.), a microphone or other speech or audio sensor or a wide variety of other sensors.

In one example, mass transit client component 154 uses user interface logic 156 to generate user interfaces 116 with user input mechanisms 118 for interaction by user 120. User 120 can interact with user input mechanisms 118 in order to see information that identifies a suggested route generated by route determination logic 130, a suggested originating stop that may be generated by logic 130 or alternate stop identifier logic 132, and that can also provide user input mechanisms that allow user 120 to provide crowd sourced data, to interact with the information surfaced by mass transit client component 154, or to perform a wide variety of other tasks or functions.

Figure 2:
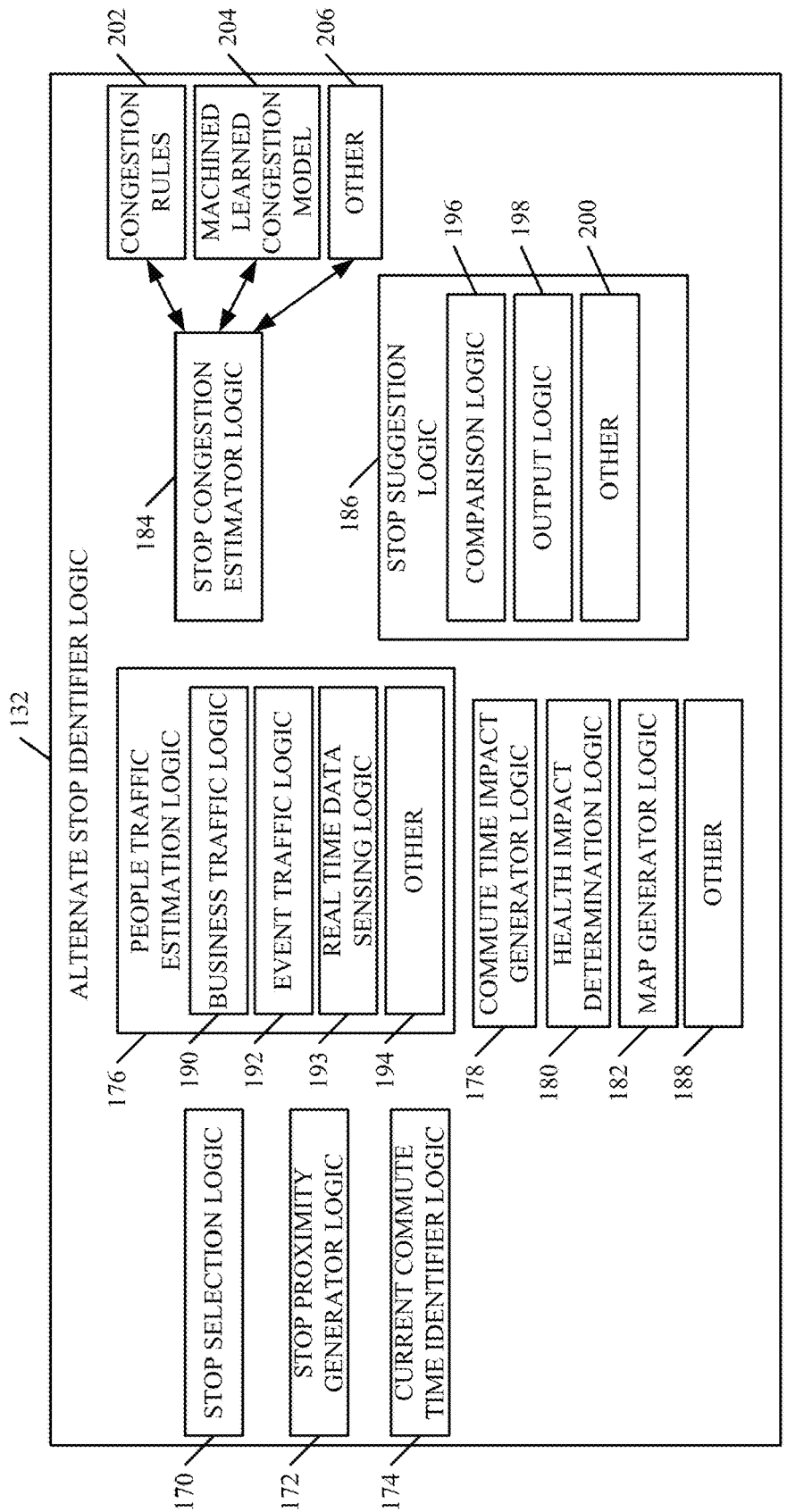
FIG. 2 is a block diagram showing one example of alternate stop identifier logic in more detail.

FIG. 2 is a block diagram showing one example of alternate stop identifier logic 132 in more detail. Alternate stop identifier logic 132 illustratively includes stop selection logic 170, stop proximity generator logic 172, current commute time identifier logic 174, people traffic estimation logic 176, commute time impact generator logic 178, health impact determination logic 180, map generator logic 182, stop congestion estimator logic 184, stop suggestion logic 186, and it can include a wide variety of other items 188. People traffic estimation logic 176 can include business traffic logic 190, event traffic logic 192, real time data sensing logic 193, and other items 194. Stop suggestion logic 186 can include comparison logic 196, output logic 198, and it can include other items 200. Stop congestion estimator logic 184 may include, or access, a set of congestion rules 202, a machine learned congestion model 204, or a wide variety of other items 206. Again, prior to describing the operation of alternate stop identifier logic 132 in more detail, a brief description of some of the items in alternate stop identifier logic 132, and their operation, will first be provided.

Stop selection logic 170 can be used to select one or more mass transit stops in the general proximity of user 120 (or in a close proximity to the user's normal originating stop). Stop proximity generator logic 172 can be used to identify the particular proximity of the selected stop in relation to user 120 (or the user's normal originating stop) to find out how far away a selected stop is from the user 120 (or from the user's normal originating stop). Current commute time identifier logic 174 can generate a current commute time indicator indicating a current commute time for a user taking the route that user 120 will be taking (and that was determined by route determination logic 130). This can be done based on crowd sourced information or other automated or manual input mechanisms that provide information indicating how long it takes a particular mass transit vehicle to travel through the determined route. It can also be based on historical data indicative of the current commute time, historically, at this time of day, on this particular day of week or month, etc.

People traffic estimation logic 176 illustratively generates information indicative of a current level of people traffic at the selected mass transit stop. Business traffic logic 190, for instance, can access the business metadata 142 to identify businesses located on the route or in relatively close proximity to user 120, and to identify the business hours and size of the businesses. This information can be used to generate a metric indicative of the people traffic that will be caused by businesses in the area of user 120 or along the route.

Event traffic logic 192 can access event data 140 to identify events in the area of user 120 (or that may affect the traffic at the location of user 120), the normal attendance or expected or actual attendance at the event, its location relative to user 120 along the user's desired route, its proximity to the user, etc. Logic 192 can then generate a people traffic identifier indicative of the people traffic that may be caused by any events in the area of user 120, or along the route.

Stop congestion estimator logic 184 can then use the various information generated or obtained by logic 170, 172, 174 and 176 to generate an indication as to the particular congestion that will be encountered at the selected stop. This can be done by using a set of congestion rules 202 that are determined empirically or otherwise. It can also be done by using a machine learned congestion model 204 that models congestion, based upon a set of input parameters, or in otherways 206. The stop congestion estimator logic 184 can provide a congestion output that indicates whether mass transit vehicles will be available and have capacity, so that user 120 can embark on those vehicles at the selected stop. It may also provide an indication indicating how long it will be before such as a vehicle arrives, the likelihood that the vehicle will be at its capacity, whether it is likely to have seating, among a wide variety of other things.

Stop suggestion logic 186 can then determine whether the user 120 should use any alternate stops and it can then surface an indication of such an alternate stop for user 120. For instance, comparison logic 196 can compare the congestion output generated by stop congestion estimator logic 184 for the user's normal originating stop, and for another stop in close proximity, that is selected by stop selection logic 170. It can determine how long it may take user 120 to relocate to the alternate stop, and then compare the overall commute time of the two stops, to determine whether it should surface and suggest the alternate stop for user 120. If so, it can control output logic 198 to surface an indication of that stop for the user 120. If not, it can control stop selection logic 170 to select another mass transit stop in close proximity to user 120, and it can perform the comparison for that alternate stop. This can continue for all mass transit stops that are within a threshold distance of user 120, or of the normal originating stop for user 120, or it can continue under other criteria as well.

Output logic 198 can access commute time impact generator logic 178, health impact determination logic 180 and map generator 182 in generating and surfacing the output for user 120. Commute time impact generator logic 178 illustratively generates an output indicative of the impact of the user relocating to the suggested alternate stop on the user's commute time. For instance, logic 178 may generate an output indicating that it is estimated that the next three mass transit vehicles that the user would take, at the user's normal originating stop, will be at capacity, and that the vehicles come to that stop once every 10 minutes. Therefore, the output can indicate that it is estimated that the user will not be able to embark on a mass transit vehicle at that stop for the next 40 minutes. It can also indicate that it is estimated that it would take the user approximately 10 minutes to walk to the alternate stop and that if the user did that, the user could expect to embark on a mass transit vehicle within 10 minutes of arriving at that stop. Therefore, the output may indicate that it is estimated that the user would save approximately 20 minutes in his or her commute time.

Health impact determination logic 180 may provide health impact information indicating the impact that it may have on the user's health. For instance, health impact determination logic 180 may identify the distance that the alternate stop is from the current location of user 120. It may indicate that, at the user's normal walking speed, if the user walked to the suggested alternate stop, the user would burn X number of calories and take Y number of steps, over Z elevation changes, etc. These are examples only.

Map generator logic 182 may illustratively generate an interactive or other map display that shows the user the specific location of the suggested alternate stop and that provides directions from the user's current location to that stop. Again, this is only one example.

Figure 3:
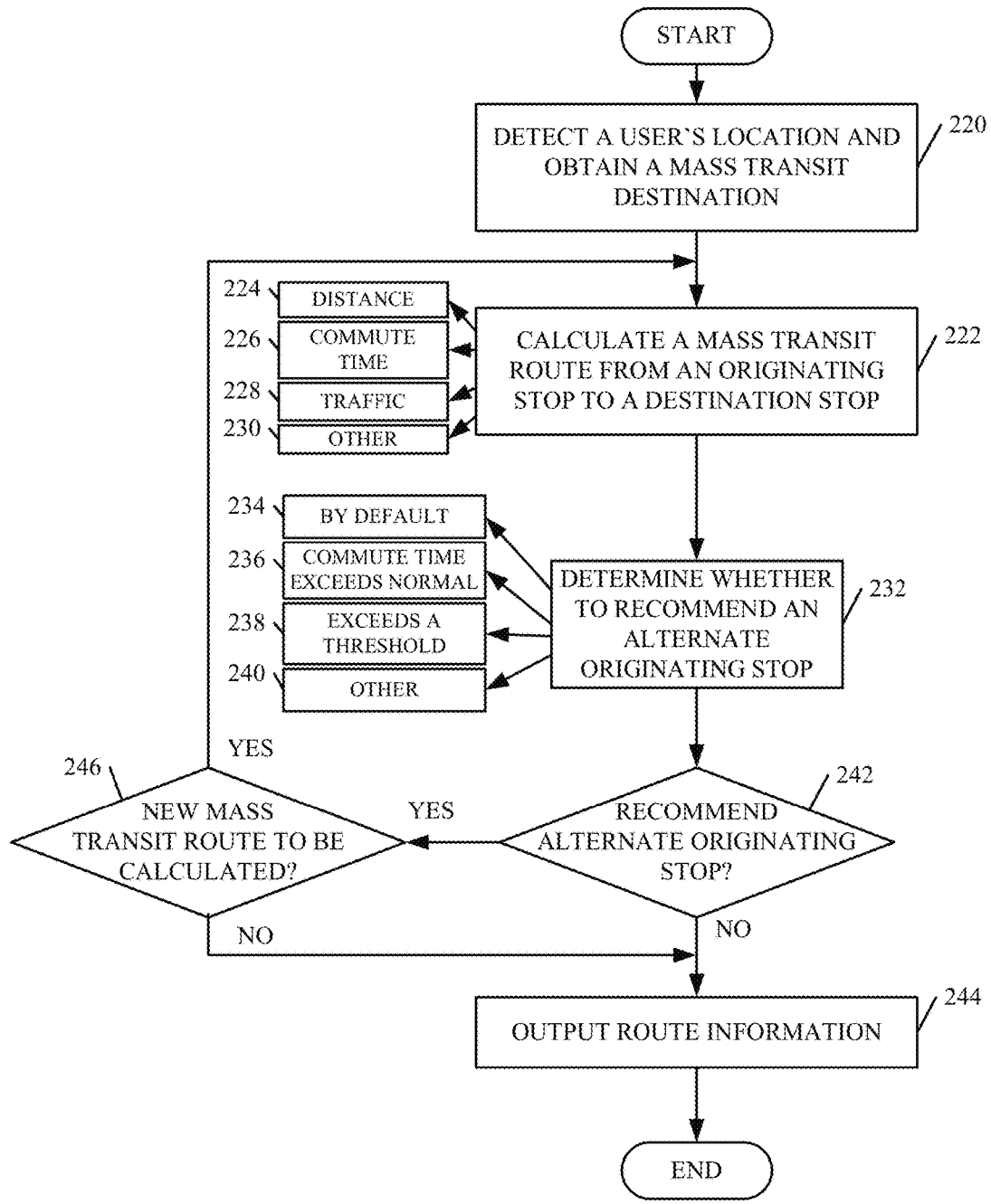
FIG. 3 is a flow diagram illustrating one example of the overall operation of the architecture shown in FIG. 1.

FIG. 3 is a flow diagram illustrating one example of the overall operation of architecture 100, illustrated in FIG. 1, in outputting route information, with a recommended originating stop, for user 120. FIGS. 1-3 will be described in conjunction with one another.

Location system 152 first detects a user's location and obtains a mass transit destination. As described above, these can be obtained automatically or mass transit client component 154 can surface a user input mechanism that allows user 120 to provide this information. This is indicated by block 220 in the flow diagram of FIG. 3. By automatically it is meant, in one example, that it is done without any further user input, except perhaps to start or authorize the operation. In an automatic example, routing system 124 in mass transit computing system 102 receives the user's location from location system 152, and route determination logic 130 then accesses user destination/preference data 136 to automatically obtain a destination for user 120. For instance, if it is the end of the business day for user 120, and user 120 is approaching his or her normal originating mass transit stop, then logic 130 can determine that the user is leaving work, and heading home. Thus, logic 130 can obtain the user's normal originating stop and destination stop (near the user's home) from user destination preference data 136. Thus, automatic and manual mechanisms for obtaining the user's current location and destination are both contemplated herein.

Route determination logic 130 then calculates a mass transit route from the originating stop to a destination stop. This is indicated by block 222. This can be done using any of a wide variety of different criteria. For instance, the route may be calculated for shortest distance or time between the starting (or originating) and ending (or destination) mass transit stops. In doing so, it can use current commute time identifier logic 174 to identify a current estimate of the commute time for user 120. It can calculate the mass transit route based on estimated traffic on the route, number of stops on the route, and other items. Calculating the mass transit route for shortest distance is indicated by block 224. Calculating it for shortest commute time or based on traffic estimations is indicated by blocks 226 and 228. Calculating it based on other criteria is indicated by block 230.

Alternate stop identifier logic 132 then determines whether to recommend an alternate originating stop to user 120. This may be a stop that the user does not normally use as his or her originating stop, and it may be recommended based upon a variety of different criteria. Determining whether to recommend an alternate originating stop is indicated by block 232 in the flow diagram of FIG. 3. It is also discussed in greater detail below with respect to FIGS. 4A and 4B.

In one example, logic 130 can automatically, and by default, check all mass transit stops that user 120 could use as an originating stop, within a predetermined threshold proximity of the user's normal originating stop (or of the current location of user 120), to determine whether any of them may be better to use. Checking alternate stops by default is indicated by block 234.

Logic 132 can determine that an alternate originating stop should be recommended for the user if the user's commute time 226 from his or her normal originating stop exceeds his or her normal commute time. This is indicated by block 236.

Logic 132 can determine to recommend an alternate originating stop based on the user's commute time 226 exceeding a threshold commute time. This is indicated by block 238.

Logic 132 can determine whether to recommend an alternate originating stop based on a wide variety of other criteria as well. This is indicated by block 240.

If alternate stop identifier logic 132 determines that an alternate originating stop does not need to be surfaced or recommended to the user, as indicated by block 242, then route determination logic 130 uses user device 104 to output or surface the route information corresponding to the calculated route, for user 120. This is indicated by block 244.

It may be that, if an alternate originating stop is recommended for user 120, the user's route may change. For instance, if the user walks 10 minutes to an alternate originating stop, then it may be that the route the user should take on the mass transit system changes, because there is a faster route available from that alternate originating stop. Thus, once alternate stop identifier logic 132 determines that an alternate stop should be recommended for the user, then route determination logic 130 determines whether a new mass transit route should be calculated. This is indicated by block 246 in FIG. 3. If so, processing reverts to block 222 where the new mass transit route is calculated from the alternate originating stop to the user's destination stop, and the process repeats. If, at block 246, route determination logic 130 determines that a new route does not need to be calculated, then, as described above, the route information is surfaced for user 120, as indicated by block 244.

Figure 4A:
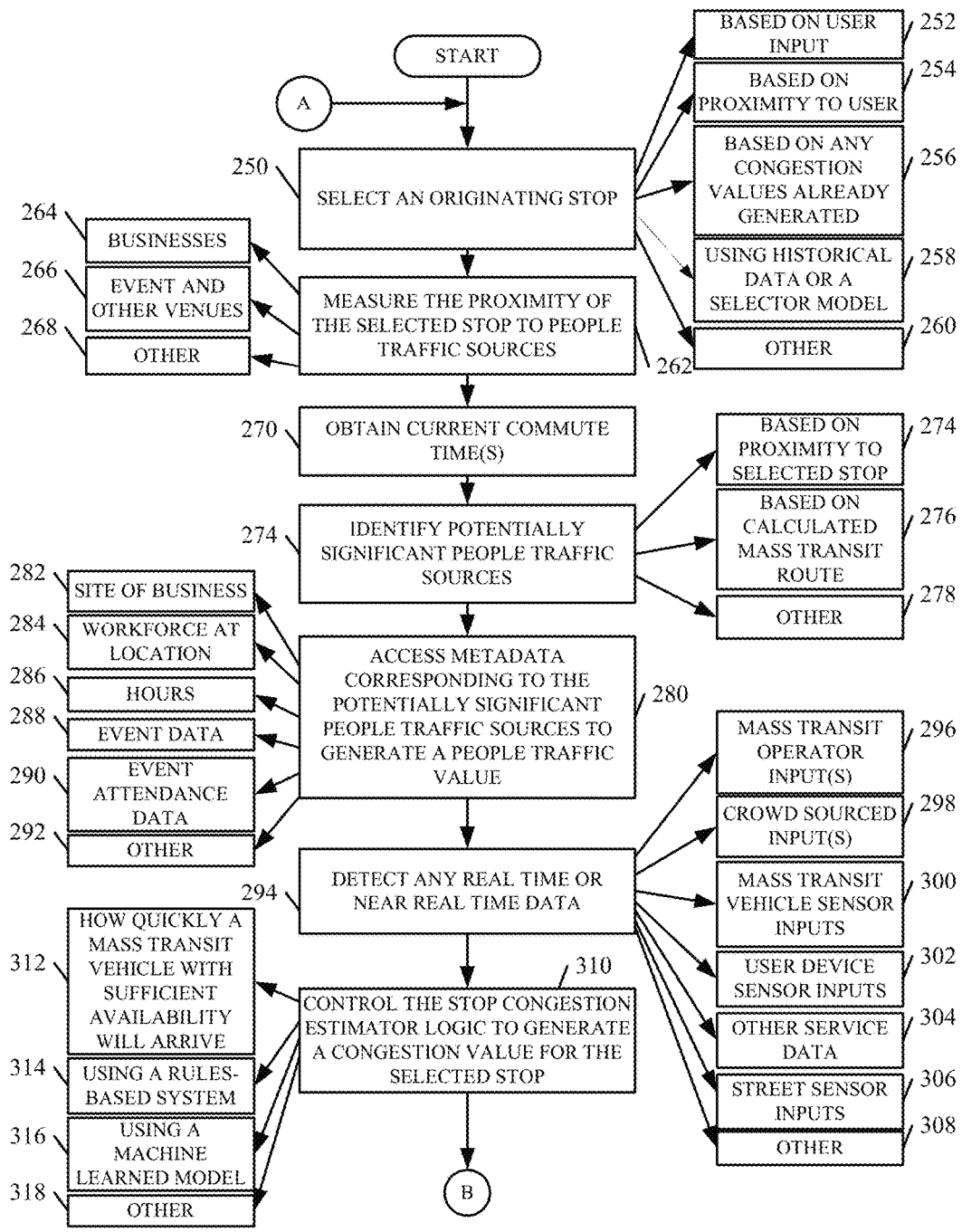
FIGS. 4A and 4B (collectively referred to herein as FIG. 4) show a flow diagram illustrating one example of the operation of the alternate stop identifier logic shown in FIG. 2.
Figure 4B:
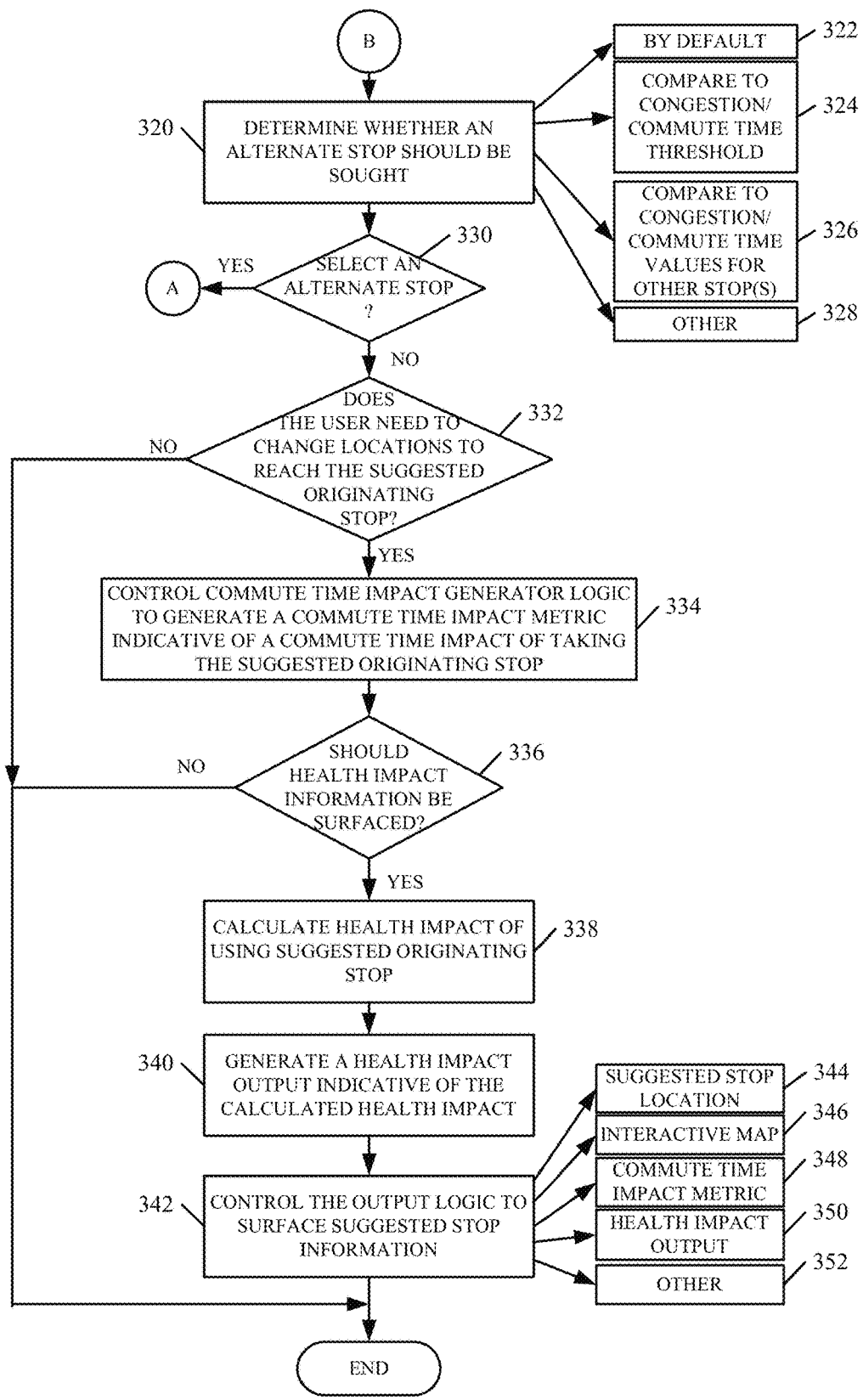

FIGS. 4A and 4B (collectively referred to herein as FIG. 4) illustrate a flow diagram showing the operation of architecture 100 and alternate stop identifier logic 132, in determining whether to recommend an alternate originating stop, and in identifying the alternate originating stop to be output (or recommended) to user 120. This corresponds to block 232 in the flow diagram of FIG. 3.

Stop selection logic 170 first selects an originating stop for processing. This is indicated by block 250 in the flow diagram of FIG. 4. This can be based on a user input as indicated by block 252. For instance, it may be that user 120 wishes to have the system process a particular originating stop to determine whether it is best, or so that the user 120 can view the commute times and commute time impact associated with that stop. If so, the user can select or otherwise input an indication of the stop for processing.

Stop selection logic 170 can select an originating stop based on its proximity to user 120. This is indicated by block 254. For instance, it may be that logic 170 selects the nearest originating stop to the current location of user 120.

In another example, mass transit computing system 102 may have already generated values that are indicative of congestion at various stops in the mass transit system. This information may have been generated for other users, it may have been pre-computed for user 120, it may be based on crowd sourced data or a wide variety of other information sources. If so, stop selection logic 170 can select a particular originating stop for processing, based on any congestion values already generated. This is indicated by block 256.

In another example, stop selection logic 170 can select an originating stop using historical data or a selector model that can be used to output the identity of a particular originating stop that the user often uses, that may be best at this time of day, etc. Selecting the originating stop for processing based on historical data is indicated by block 258.

Stop selection logic 170 can select an originating stop for consideration and processing using other criteria as well. This is indicated by block 260.

Stop proximity generator logic 172 then measures or otherwise identifies the proximity of the selected originating stop to various sources of people traffic that may congest the stop. This is indicated by block 262 in the flow diagram of FIG. 4. In one example, it can identify business locations in proximity to the originating stop. This is indicated by block 264. It may, for instance, identify businesses with a workforce that exceeds a threshold number of people. It can identify event and other venues that may be potential sources of people traffic at the selected originating stop. This is indicated by block 266. It can identify the proximity of the selected stop to people traffic sources in other ways as well. This is indicated by block 268.

Current commute time identifier logic 174 can then detect or otherwise obtain current commute times from the selected stop to the user's destination stop. This is indicated by block 270. This can be based on historical data, based on crowd sourced current or live data, based on inputs from mass transit operators, or in other ways.

Of the various businesses and event venues and other venues for which the proximity to the user's selected stop has been calculated in block 262, logic 132 then identifies any of those sources of people traffic that are potentially significant to the user, at the current time, at the selected originating stop. This is indicated by block 272. For instance, the sources of people traffic may be limited to those which are only within a predetermined or dynamically decided proximity of the selected originating stop. This is indicated by block 274. In another example, the potentially significant people traffic sources may be identified based on the calculated mass transit route that has been calculated by route determination logic 130. For instance, it may be that a sports stadium is in very close proximity to the selected originating stop. However, it may be that the sports stadium is actually up steam, along the mass transit route, from the selected originating stop and the event is about to start. This would mean that most people will be exiting the mass transit vehicles one stop up stream of the selected originating stop, and therefore, even though the venue is very close to the selected originating stop, it will not be a significant source of people traffic, based upon the calculated mass transit route. Identifying potentially significant people traffic sources based on the calculated mass transit route is indicated by block 276. The potentially significant people traffic sources can be identified in other ways as well, and this is indicated by block 278.

People traffic estimation logic 176 then accesses the event data and metadata 140 and 142 corresponding to the potentially significant people traffic sources to generate a people traffic value corresponding to the people traffic that will be generated by those sources. This is indicated by block 280. For instance, business traffic logic 190 can identify the location or site of the businesses that have been identified as potentially significant sources of people traffic. This is indicated by block 282. It can identify the workforce at that location as indicated by block 284. It can identify the work hours as indicated by block 286, to determine whether it will be a heavy commute time for those businesses.

Event traffic logic 192 can access event data 140 to determine whether any events are occurring at the present time, or are about to occur or have just ended. This may be based on calendar data or other information that identifies when, where, and what time of day events will take place. The event data is indicated by block 288 in the flow diagram of FIG. 4. Event traffic logic 192 may also access event attendance data 290 which indicates the actual or estimated attendance at a particular event. The metadata can be a wide variety of other metadata as well. This is indicated by block 292.

Real time data sensing logic 193 then illustratively detects any real time data or near real time data that may be indicative of people traffic at the selected originating stop. This is indicated by block 294. For instance, this can be data from mass transit operator input mechanisms 110, as indicated by block 296 in the flow diagram of FIG. 4. It may be information from crowd source input mechanisms 112, as indicated by block 298. It may be from mass transit vehicle sensor inputs 300, from user device sensor inputs 302, from other data services 304, from street sensor inputs 306, or from a wide variety of other inputs 308.

People traffic estimation logic 176 then provides the estimations or measurements or other metrics generated, that are indicative of people traffic in the area of the selected mass transit stop, to stop congestion estimator logic 184. Stop congestion estimator logic 184 is then controlled to generate a congestion value for the selected stop. This is indicated by block 310. For instance, the congestion value can indicate how quickly a mass transit vehicle with sufficient availability will arrive for user 120 at the suggested stop. This is indicated by block 312. It can do this by accessing congestion rules 202 in a rules based system. This is indicated by block 314. It can access a machine learned or other congestion model 204. This is indicated by block 316. It can generate a congestion value for the selected stop in other ways as well, and this is indicated by block 318.

Stop suggestion logic 186 then determines whether an alternate stop should be sought, for user 120. This is indicated by block 320 in the flow diagram of FIG. 4. In one example, this can be done automatically, and by default, as indicated by block 322. For instance, stop suggestion logic 186 can control stop selection logic 170 to select a next closest stop (that will work for the user's destination) to the user's current location, or to the user's normal originating stop, or to the previous selected stop.

In another example, comparison logic 196 compares the congestion value or commute time for the currently selected originating stop to a threshold value or to values that were previously calculated (or that are subsequently calculated) for other selected originating stops. Comparing the congestion value or commute time to a threshold value is indicated by block 324 and comparing it to values for other stops is indicated by block 326. Stop suggestion logic 186 can determine whether an alternate stop should be sought in other ways as well. This is indicated by block 328.

Once stop suggestion logic 186 determines that it has the proper originating stop that should be suggested to user 120, as indicated by block 330 in the flow diagram of FIG. 4, it uses stop proximity generator logic 172 to determine whether the user needs to change locations to reach the suggested originating stop. This is indicated by block 332. For instance, it can use location system 152 on user device 104 to determine the current location of user 120. It can then compare that to the location corresponding to the originating stop that is suggested to the user, to determine whether the user is already at the suggested stop, or whether the user needs to change locations (such as to walk to another, nearby stop, etc.).

If the user does need to change locations, then output logic 198 controls commute time impact generator logic 178 to generate a commute time impact metric indicative of a commute time impact of taking the suggested originating stop (as opposed to the stop at which user 120 is currently located). This is indicated by block 334. Commute time impact generator logic 178 can calculate the commute time impact metric in a variety of different ways. For instance, it can calculate a time savings value and output a textual message or other visual or audio message for user 120 that indicates this. By way of example, the commute time impact metric may indicate "The next three buses will likely be full, and one bus is scheduled to arrive here every 10 minutes. Therefore, if you walk 10 minutes to the bus stop located at XYZ Street, you will save 25 minutes on your commute home." Of course, this is only one example of a commute time impact metric that can be generated by commute time impact generator logic 178. In doing so, logic 178 can access other sensors or systems or data to estimate the amount of time it will take user 120 to relocate to the suggested originating stop, and to generate an indication of the amount of time it will take to commute to the user's destination from that stop.

Output logic 198 then controls health impact determination logic 180 to determine whether any health impact information should be surfaced. This is indicated by block 336. For instance, it may be that user 120 wishes to know how much he or she walks during a day, the number of calories he or she burns during the day, etc. If so, then output logic 198 controls health impact determination logic 180 to calculate the health impact of the user 120 using the suggested originating stop instead of the stop where the user is currently located. This is indicated by block 338. Logic 180 then generates a health impact output indicative of the calculated health impact. This is indicated by block 340.

The health impact output can take a wide variety of different forms. For instance, it may be a textual output indicating that the user will walk an additional X steps if the user moves to the suggested originating stop. It may indicate the number of calories the user will burn (based on the distance, elevation changes, the user's weight, etc.) if the user relocates to the suggested originated stop. It may calculate benefits in terms of heart conditioning, or other physical, or mental conditioning attributed to the user relocating to the suggested originating stop. All of these are examples only.

Stop suggestion logic 186 then controls output logic 198 to surface the suggested stop information corresponding to the suggested stop, for the user. In doing so, it can send that information to user device 104 which uses user interface logic 156 to surface the information on a user interface 116. Surfacing the suggested stop information is indicated by block 342 in the flow diagram of FIG. 4.

The suggested stop information can take a variety of different forms. For instance, it can include the suggested stop location as indicated by block 344. It can also include a static or interactive map generated by map generation logic 182 showing the user how to get to the suggested stop. An interactive map is indicated by block 346. It can include the commute time impact metric discussed above. This is indicated by block 348. It can include the health impact output discussed above, as indicated by block 350. It can also include a wide variety of other information as well, and this is indicated by block 352.

It can thus be seen that the present description can be used to control stop suggestion logic 186 to suggest mass transit stops to various users, and control devices 104 to control user traffic by directing users to various mass transit stops, based upon information that a user may otherwise be unaware of. Particularly where a user is new to an urban location, the user may not be aware of different mass transit stops or their proximity to significant sources of people traffic, during different times of the day. By detecting the user's location, and then correlating it to significant sources of people traffic, the present description can be used to control routing systems or other systems that are used to direct users or other traffic to particular mass transit stops, given the user's destinations. It can also be used to control the mass transit system itself. It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
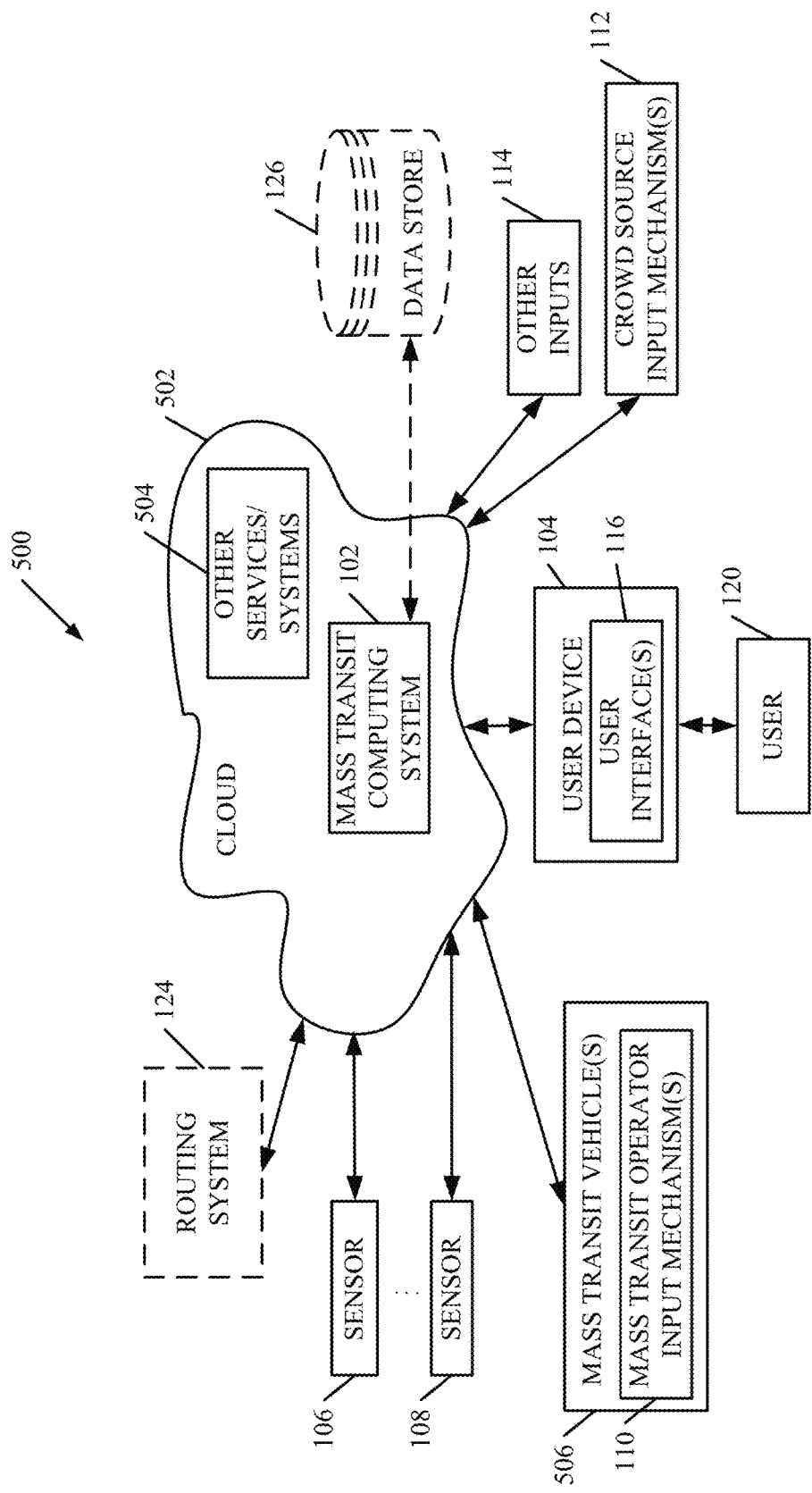
FIG. 5 is a block diagram showing one example of the architecture illustrated in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that mass transit computing system 102 and other remote services or systems 504 can be located in cloud 502 (which can be public, private, or a combination where portions are public while others are private). Therefore, input mechanisms 110 in mass transit vehicles, sensors 106-108, and crowd source input mechanisms 112 and other inputs 114 can provide inputs to system 102 either directly or over a network or otherwise. Also, user 120 uses user device 104 to access those systems through cloud 502.

FIG. 5 also depicts another example of a cloud architecture. FIG. 5 shows that it is also contemplated that some elements of architecture 100 can be disposed in cloud 502 while others are not. By way of example, data store 126 can be disposed outside of cloud 502, and accessed through cloud 502. In another example, routing system 124 can be outside of cloud 502. Regardless of where they are located, they can be accessed directly by device 104, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
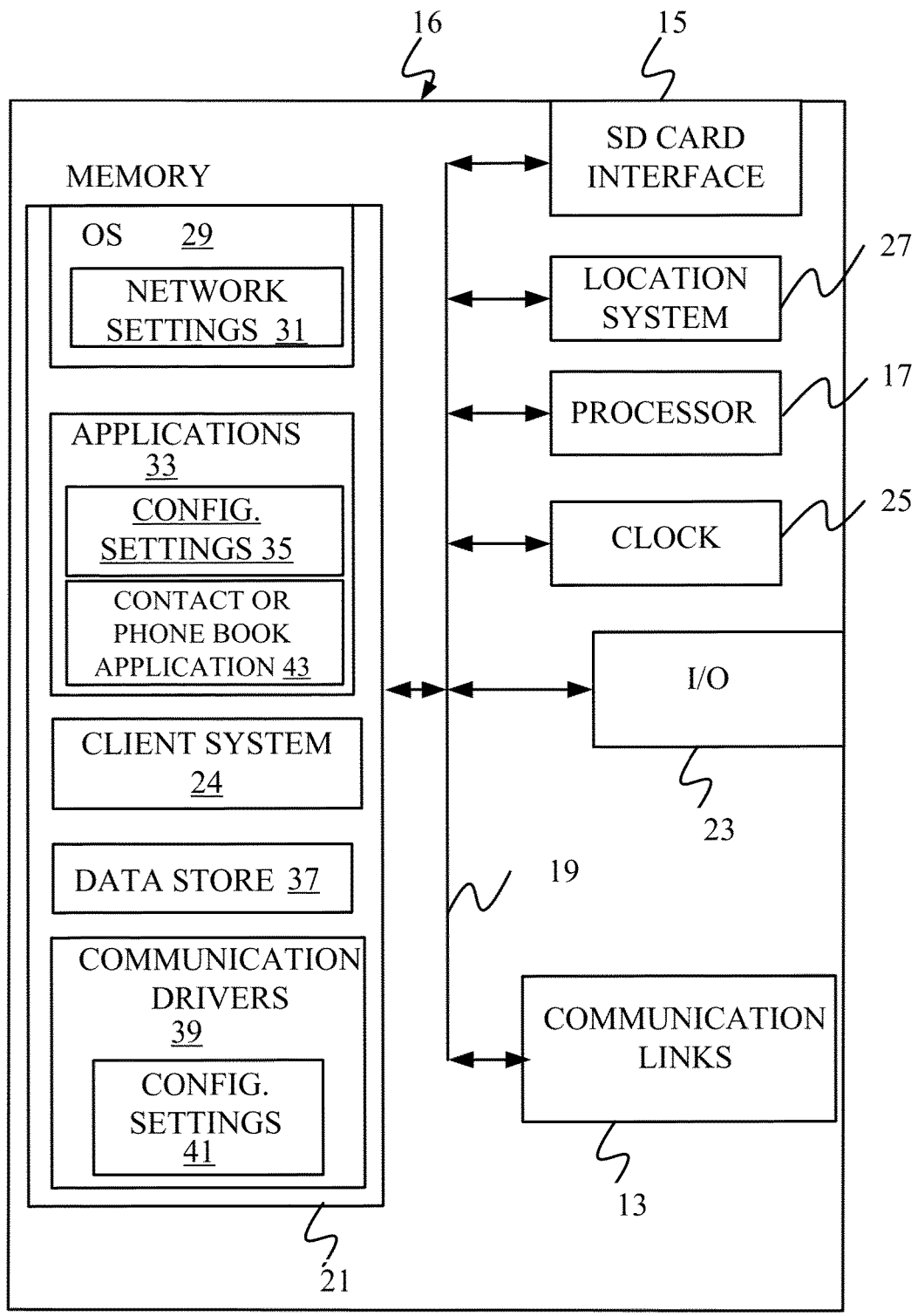
FIGS. 6-8 show examples of mobile devices that can be used in the architectures shown in the previous figures.
Figure 7:
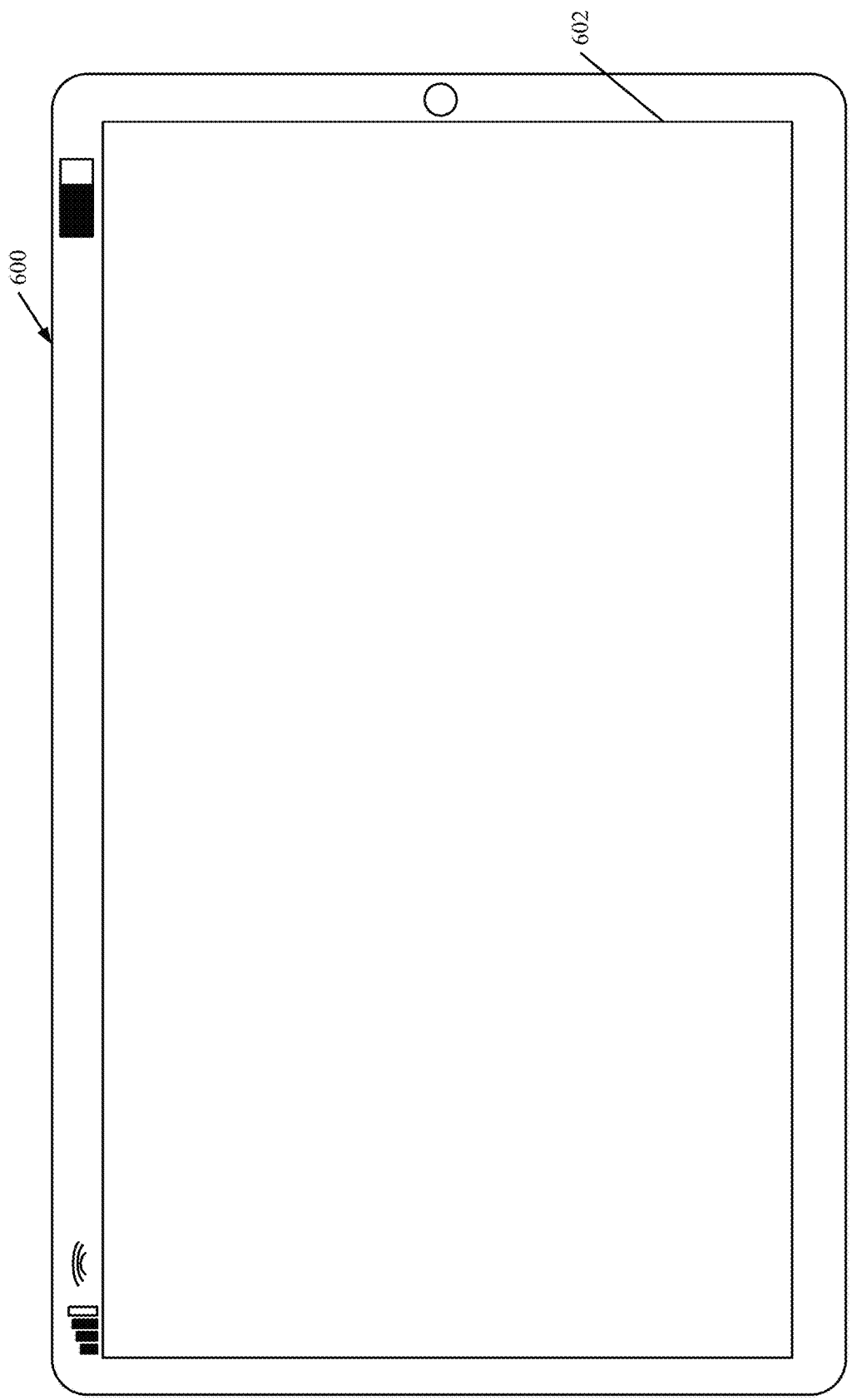
Figure 8:
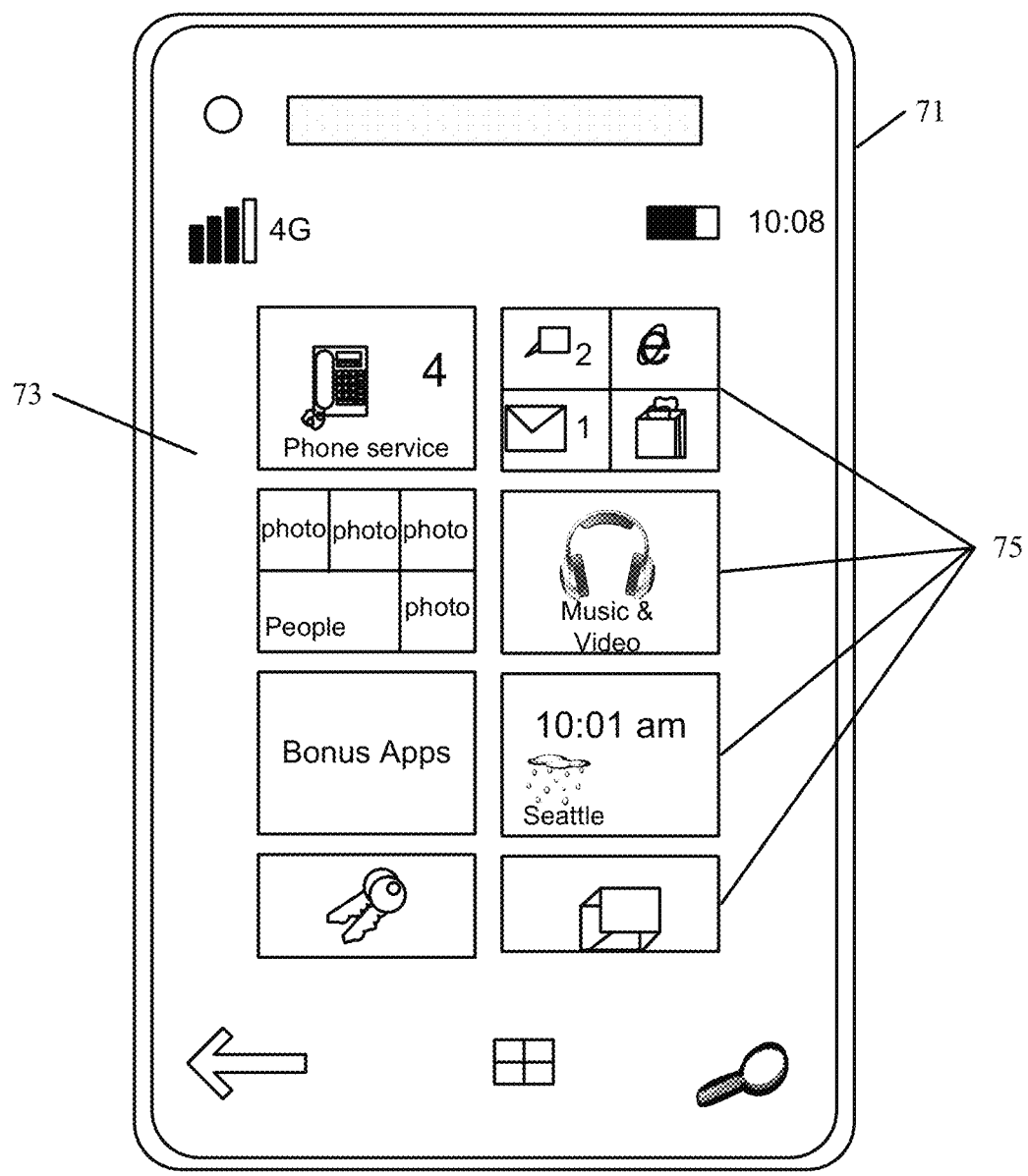

FIG. 6 is a simplified block diagram of one illustrative example of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors 122 or 150 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of tenant 104. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one example in which device 16 is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
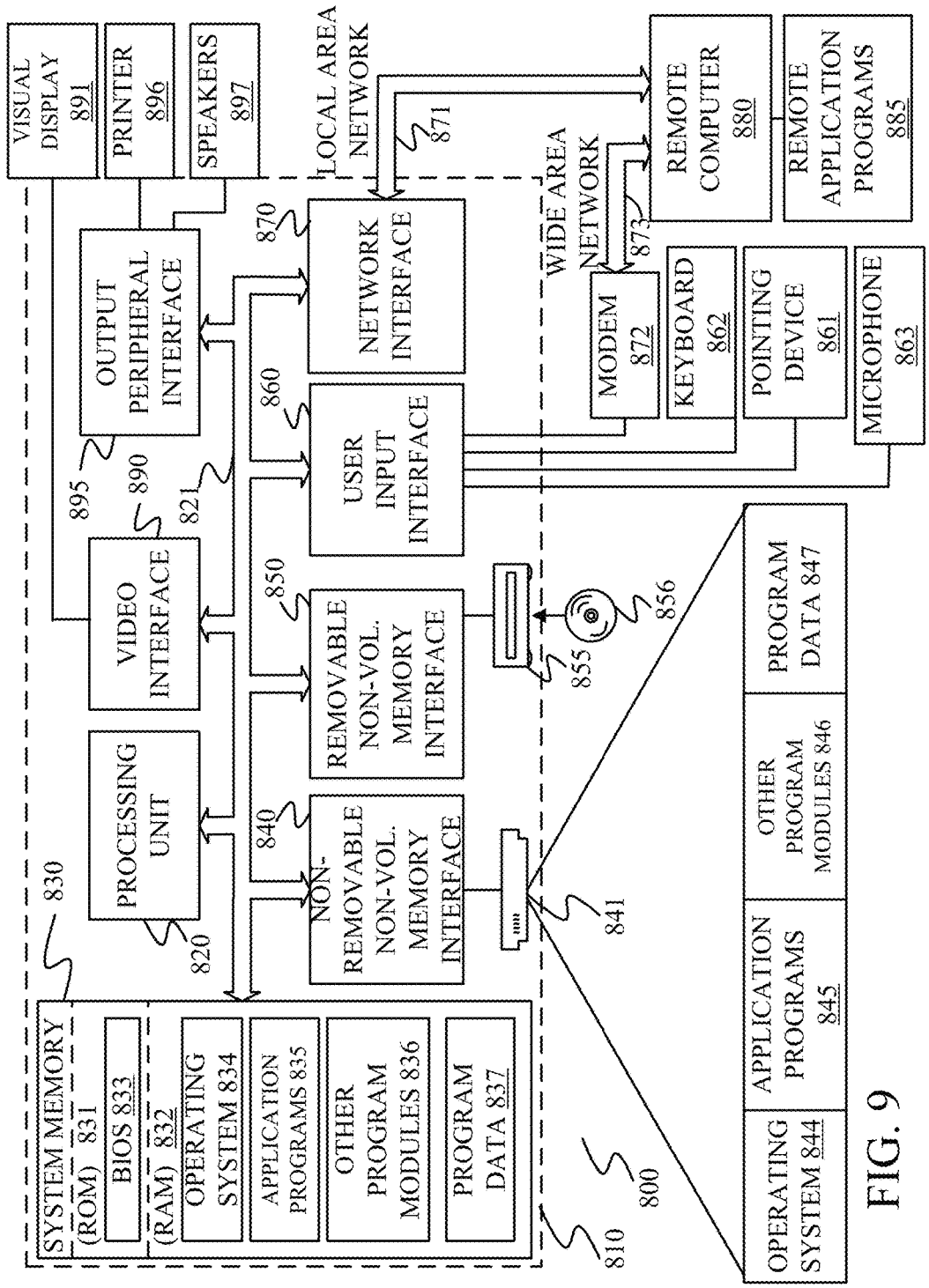
FIG. 9 is a block diagram of one example of a computing environment that can be used in the architectures shown in the previous figures.

FIG. 9 is one example of a computing environment in which architecture 100, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processors or servers 122 or 150), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
stop congestion logic that generates a congestion indicator indicative of people traffic congestion on a mass transit system at a plurality of different mass transit stops;
stop suggestion logic that obtains a user location and mass transit route and identifies a suggested origination stop for a user based on the congestion indicators for the plurality of different mass transit stops, the user location and the mass transit route;
commute time impact generator logic that generates a commute time impact metric indicative of a commute time impact on a commute time for the user based on the user relocating from the user location to the suggested origination stop; and
output logic that generates a control signal to control surfacing of the suggested origination stop and the commute time impact metric.

Example 2 is the computing system of any or all previous examples and further comprising:
stop selection logic configured to select an origination stop, from the plurality of different mass transit stops, for which a congestion indicator is to be generated.

Example 3 is the computing system of any or all previous examples wherein the stop selection logic selects the plurality of different mass transit stops based on a proximity of the different mass transit stops to the user location and the route Example 4 is the computing system of any or all previous examples and further compromising:
stop proximity generator logic configured to detect a set of people traffic sources within a proximity of the selected origination stop and based on the mass transit route.

Example 5 is the computing system of any or all previous examples and further comprising:

people traffic estimation logic configured to access metadata corresponding to the set of people traffic sources and generate a people traffic value corresponding to people traffic from each people traffic source in the set of people traffic sources and provide the people traffic values to the stop congestion logic, the stop congestion logic generating a congestion indicator indicative of people traffic congestion on the mass transit system at the plurality of different mass transit stops based on the people traffic values.

Example 6 is the computing system of any or all previous examples wherein the people traffic estimation logic comprises:

business traffic logic configured to generate the people traffic value corresponding to an organization location identified as a people traffic source by identifying, as the metadata, a number of workers at the organization, and working hours of the organization.

Example 7 is the computing system of any or all previous examples wherein the people traffic estimation logic comprises:

event traffic logic configured to generate the people traffic value corresponding to an event venue identified as a people traffic source by identifying, as the metadata, an event time and event attendance data for the event.

Example 8 is the computing system of any or all previous examples wherein the stop congestion logic generates the congestion indicator as a time indicator indicative of an estimated time before a mass transit vehicle, with available passenger capacity, will arrive at a mass transit stop corresponding to the user location.

Example 9 is the computing system of any or all previous examples and further comprising:

health impact determination logic configured to generate a health impact output indicative of a health impact on the user, corresponding to the user relocating from the user location to the suggested origination stop, and generate a control signal to control surfacing of the health impact output.

Example 10 is the computing system of any or all previous examples wherein the stop congestion logic receives a mass transit vehicle input generated on a mass transit vehicle and being indicative of congestion at a mass transit stop.

Example 11 is the computing system of any or all previous examples wherein the stop congestion logic receives a mass transit operator input generated by a mass transit vehicle operator device and being indicative of congestion at a mass transit stop.

Example 12 is the computing system of any or all previous examples wherein the stop congestion logic receives a crowd sourced input indicative of congestion at a mass transit stop.

Example 13 is a computer implemented method, comprising:

generating a congestion indicator indicative of people traffic congestion on a mass transit system at a plurality of different mass transit stops;

receiving a user location and mass transit route;

identifying a suggested origination stop for a user based on the congestion indicators for the plurality of different mass transit stops, the user location and the mass transit route;

generating a commute time impact metric indicative of a commute time impact on a commute time for the user based on the user relocating from the user location to the suggested origination stop; and generating a control signal to control surfacing of the suggested origination stop and the commute time impact metric.

Example 14 is the computer implemented method of any or all previous examples and further comprising:

selecting an origination stop, from the plurality of different mass transit stops, for which a congestion indicator is to be generated; and detecting a set of people traffic sources within a given proximity of the selected origination stop and based on the mass transit route.

Example 15 is the computer implemented method of any or all previous examples and further comprising:

accessing metadata corresponding to the set of people traffic sources;

generating a people traffic value corresponding to people traffic from each people traffic source in the set of people traffic sources; and providing the people traffic values to the stop congestion logic, the stop congestion logic generating a congestion indicator indicative of people traffic congestion on the mass transit system at the plurality of different mass transit stops based on the people traffic values.

Example 16 is the computer implemented method of any or all previous examples wherein generating the people traffic value comprises:

generating the people traffic value corresponding to an organization location identified as a people traffic source by identifying, as the metadata, a number of workers at the organization, and working hours of the organization.

Example 17 is the computer implemented method of any or all previous examples wherein generating the people traffic value comprises:

generating the people traffic value corresponding to an event venue identified as a people traffic source by identifying, as the metadata, an event time and event attendance data for the event.

Example 18 is the computer implemented method of any or all previous examples wherein generating the congestion indicator comprises:

generating a time indicator indicative of an estimated time before a mass transit vehicle, with available passenger capacity, will arrive at a mass transit stop corresponding to the user location.

Example 19 is the computer implemented method of any or all previous examples and further comprising:

generating a health impact output indicative of a health impact on the user, corresponding to the user relocating from the user location to the suggested origination stop; and generating a control signal to control surfacing of the health impact output.

Example 20 is a computing system, comprising:

stop proximity generator logic configured to detect a set of people traffic sources within a proximity of a mass transit stop in a mass transit system, based on a mass transit route;

people traffic estimation logic configured to access metadata corresponding to the set of people traffic sources and generate a people traffic value corresponding to people traffic from each people traffic source in the set of people traffic sources;

stop congestion logic that receives the people traffic values and generates a congestion indicator indicative of people traffic congestion on the mass transit system at a plurality of different mass transit stops based on the people traffic values;

stop suggestion logic that obtains a user location and the mass transit route and identifies a suggested origination stop for a user based on the congestion indicators for the plurality of different mass transit stops, the user location and the mass transit route;

commute time impact generator logic that generates a commute time impact metric indicative of a commute time impact on a commute time for the user based on the user relocating from the user location to the suggested origination stop; and output logic that generates a control signal to control surfacing of the suggested origination stop and the commute time impact metric.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
a processor; and
memory storing instructions executable by the processor, wherein the instructions, when executed, configure the computing system to:
access metadata corresponding to an organization location identified as a people traffic source, the metadata representing a number of workers at the organization location and working hours of the organization location;
based on the metadata, generate a people traffic value corresponding to people traffic from the people traffic source;
generate a congestion indicator indicative of people traffic congestion on a mass transit system at a plurality of different mass transit stops based on the people traffic value;
obtain a user location of a user and a destination location for the user;
obtain a first mass transit route having a first origination mass transit stop and a destination mass transit stop that corresponds to the destination location;
based on the congestion indicators, the user location, and the destination location, identify a second mass transit route that is different than the first mass transit route and includes an alternative origination mass transit stop for the user; and
determine a commute time impact on a commute time for the user to the destination location based on the user relocating from the user location to the alternative origination mass transit stop to use the second mass transit route; and
generate a control signal to control rendering, to the user, of an indication of:
the alternative origination mass transit stop, and
a commute time impact metric indicative of the commute time impact.

2. The computing system of claim 1 wherein the instructions, when executed, configure the computing system to:
select the first origination mass transit stop, from the plurality of different mass transit stops, for which a congestion indicator is to be generated.

3. The computing system of claim 2 wherein the instructions, when executed, configure the computing system to select the plurality of different mass transit stops based on a proximity of the different mass transit stops to the user location and the first mass transit route.

4. The computing system of claim 2 wherein the instructions, when executed, configure the computing system to:
select a set of people traffic sources based on:
a proximity of the first origination mass transit stop to the set of people traffic sources; and
the first mass transit route.

5. The computing system of claim 4 wherein the instructions, when executed, configure the computing system to:
access metadata corresponding to the set of people traffic sources;
generate a people traffic value corresponding to people traffic from each people traffic source in the set of people traffic sources; and
generate a congestion indicator indicative of people traffic congestion on the mass transit system at the plurality of different mass transit stops based on the people traffic values.

6. The computing system of claim 5 wherein the instructions, when executed, configure the computing system to:
generate the people traffic value corresponding to an event venue identified as a people traffic source by identifying, as the metadata, an event time and event attendance data for the event.

7. The computing system of claim 1 wherein the instructions, when executed, configure the computing system to:
generate the congestion indicator as a time indicator indicative of an estimated time before a mass transit vehicle, with available passenger capacity, will arrive at a first mass transit stop.

8. The computing system of claim 1 wherein the instructions, when executed, configure the computing system to:
generate a health impact output indicative of a health impact on the user, corresponding to the user relocating from the user location to the alternative origination mass transit stop, and generate a control signal to control surfacing of the health impact output.

9. The computing system of claim 1 wherein the instructions, when executed, configure the computing system to:
receive a mass transit vehicle input generated on a mass transit vehicle and being indicative of congestion at the first origination mass transit stop.

10. The computing system of claim 1 wherein the instructions, when executed, configure the computing system to receive at least one of:
a mass transit operator input generated by a mass transit vehicle operator device and indicative of congestion at the first origination mass transit stop; or
a crowd sourced input indicative of congestion at the first origination mass transit stop.

11. The computing system of claim 1 wherein the destination mass transit stop comprises a first destination mass transit stop, and the second mass transit route comprises a second destination mass transit stop that:
corresponds to the destination location; and
is different than the first destination mass transit stop.

12. A computer implemented method, comprising:
accessing metadata corresponding to an organization location identified as a people traffic source, the metadata representing a number of workers at the organization location and working hours of the organization location;
based on the metadata, generating a people traffic value corresponding to people traffic from the people traffic source;

generating a congestion indicator indicative of people traffic congestion on a mass transit system at a plurality of different mass transit stops based on the people traffic value;

receiving a user location of a user and a destination location for the user;

obtaining a mass transit route having:
an origination mass transit stop corresponding to the user location, and
a destination mass transit stop that corresponds to the destination location;

determining a first commute time from the origination mass transit stop to the destination mass transit stop on the mass transit route;

based on the congestion indicators, the user location, and the destination location, identifying an alternative origination mass transit stop for the user;

determining a second commute time from the alternative origination mass transit stop to the destination location;

comparing the first and second commute times to calculate a commute time impact metric indicative of a commute time impact based on the user relocating from the user location to the alternative origination alternative mass transit stop; and generating a control signal to control an output device to render, to the user, the alternative origination mass transit stop and the commute time impact metric.

13. The computer implemented method of claim 12 and further comprising:
selecting an origination stop, from the plurality of different mass transit stops, for which a congestion indicator is to be generated; and
detecting a set of people traffic sources within a given proximity of the selected origination stop and based on the mass transit route.

14. The computer implemented method of claim 13 and further comprising:
accessing metadata corresponding to the set of people traffic sources;
generating a people traffic value corresponding to people traffic from each people traffic source in the set of people traffic sources; and
providing the people traffic values to the stop congestion logic, the stop congestion logic generating a congestion indicator indicative of people traffic congestion on the mass transit system at the plurality of different mass transit stops based on the people traffic values.

15. The computer implemented method of claim 14 wherein generating the people traffic value comprises:
generating the people traffic value corresponding to an event venue identified as a people traffic source by identifying, as the metadata, an event time and event attendance data for the event.

16. The computer implemented method of claim 12 wherein generating the congestion indicator comprises:

generating a time indicator indicative of an estimated time before a mass transit vehicle, with available passenger capacity, will arrive at a mass transit stop corresponding to the user location.

17. The computer implemented method of claim 12 and further comprising:
generating a health impact output indicative of a health impact on the user, corresponding to the user relocating from the user location to the suggested origination stop; and
generating a control signal to control surfacing of the health impact output.

18. A computing system, comprising:
a processor; and
memory storing instructions executable by the processor, wherein the instructions, when executed, configure the computing system to provide:
stop proximity generator logic configured to detect a set of people traffic sources within a proximity of a mass transit stop in a mass transit system, based on a mass transit route;
people traffic estimation logic configured to:
access metadata corresponding to the set of people traffic sources, the metadata including organization metadata corresponding to an organization location identified as a people traffic source, and
representing a number of workers at the organization location and working hours of the organization location;
generate a people traffic value corresponding to people traffic from each people traffic source in the set of people traffic sources;
stop congestion logic configured to:
receive the people traffic values; and
based on the people traffic values, generate a plurality of congestion indicators for a plurality of different mass transit stops, each congestion indicator corresponding to one of the mass transit stops and being indicative of an estimated time before a mass transit vehicle, with available passenger capacity, will arrive at the corresponding mass transit stop;
stop suggestion logic configured to:
obtain a user location and the mass transit route; and
identify a suggested origination stop for a user based on the congestion indicators for the plurality of different mass transit stops, the user location and the mass transit route;
commute time impact generator logic configured to generate a commute time impact metric indicative of a commute time impact on a commute time for the user based on the user relocating from the user location to the suggested origination stop; and
output logic configured to generate a control signal to control rendering of the suggested origination stop and the commute time impact metric.

* * * * *